INVENTOR:
William B. Snow

Attorneys

Fig. 16

(Unvoiced Section Similar)

Fig. 18

INVENTOR:
William B. Snow
By Smyth, Roston & Pavitt
Attorneys

| Frequency Band | Voice Components | Oscillator Frequency | Principle Deceptals | |
|---|---|---|---|---|
| | | | Difference Frequencies | Sum Frequencies |
| 250-530 | 250<br>375<br>500 | 250 | 0<br>125<br>250 | 500<br>625<br>750 |
| 530-780 | 500<br>625<br>750 | 300 | 200<br>325<br>450 | 800<br>925<br>1050 |
| 780-1100 | 750<br>875<br>1000<br>1125 | 350 | 400<br>525<br>650<br>725 | 1100<br>1225<br>1350<br>1475 |
| 1100-1500 | 1125<br>1250<br>1375<br>1500 | 500 | 625<br>750<br>875<br>1000 | 1625<br>1750<br>1875<br>2000 |

INVENTOR:
William B. Snow
Attorneys

United States Patent Office 3,213,199
Patented Oct. 19, 1965

3,213,199
SYSTEM FOR MASKING INFORMATION
William B. Snow, Santa Monica, Calif., assignor to The Bissett-Berman Corporation, Santa Monica, Calif., a corporation of California
Filed Jan. 2, 1962, Ser. No. 163,430
23 Claims. (Cl. 179—1.5)

This invention relates to systems for masking the intelligibility of spoken words. More particularly, the invention relates to systems for masking the intelligibility of spoken words such that the intelligibility cannot be recovered. In the various systems constituting this invention, the frequency and amplitude characteristics of the spoken word are determined at each instant. These signals are then mixed with signals having amplitudes and frequencies dependent upon the amplitudes and frequencies of the signals representing the spoken words, such that the intelligibility of the spoken words becomes masked.

It is becoming increasingly important, both in business and in government, to prevent eavesdroppers for intentionally or unintentionally overhearing conversations. For example, it may be important at times in a meeting of a corporate board of directors that the thoughts expressed during the meeting should be heard only by the directors within the conference room and not by anyone who may be just outside the conference room. Such secrecy may be desirable when a new product is being discusssed for introduction to the public or when an original advertising campaign is about to be launched for a new or established product.

The practice until now has been to generate noise signals and to introduce the noise represented by the signals into the area where the intelligibility of the spoken word is to be masked. Although such a practice may have been once considered to be foolprooof, it can no longer be considered to be completely advantageous because of the advance in detecting techniques in recent years. For example, equipment is now available for detecting sounds representing intelligibility such as spoken words, even though such sounds may be completely masked by the noise to any listener. The detecting equipment now in use is able to detect and separate the sounds representing intelligibility such as spoken words even though such sounds have amplitude levels considerably lower than the amplitude levels of the noise masking the sounds.

This invention provides systems for masking sounds in particular areas such that the sounds cannot be detected even by the most sensitive detecting equipments now available. The systems constituting this invention are able to mask the sounds by determining the frequencies and amplitude characteristics of the sounds at each instant. The systems constituting this invention generate at each instant signals having frequencies and amplitudes dependent upon the frequencies and amplitudes of the signals representing the intelligible sounds at that instant. The generated signals are then broadcast in the areas where the intelligible sounds are to be masked. The listeners in these areas hear both the intelligible sounds and the broadcast signals so that the intelligible signals are masked by the broadcast signals.

In one embodiment of the invention, systems are provided for broadcasting signals having a particular pattern of amplitudes and frequencies regardless of the characteristics of the sound representing the intelligibility at that instant. A portion of the envelope of signals transmitted at the different frequencies is obtained from the sounds representing intelligence such as speech. The remaining portion of the signals constituting the particular envelope at the different frequencies is obtained from the operation of the systems constituting this invention. The pattern of signals constituting the particular envelope is preferably chosen to produce sounds which give the impression of spoken words but which do not represent any intelligibility.

Figure 1:
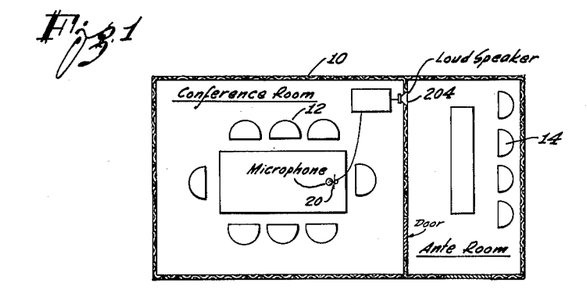
FIGURE 1 illustrates a room, the area surrounding the room, speakers in the room, and listeners outside of the room and the disposition in the room of the system constituting this invention.

In most business conversations, the people engaged in the conversation are disposed within a room. If the room is sufficiently small, the participants in the conference are able to hear one another without having to use microphones or other amplifiers. If the room is relatively large, microphones or other sound amplifiers may have to be placed at strategic positions in the room so that all of the participants in the conference can hear the conversation. It may sometimes even be desirable to provide earphones for each individual participant. By way of illustration, a room 10 may be provided for a business conference and participants 12 may be disposed within the room.

The systems constituting this invention are adapted to be used so that persons 14 outside of the room cannot understand the words being spoken in the conference room 10. The systems constituting this invention detect and amplify the words spoken at each instant by the participants in the room and combine these sounds with sounds generated at each instant by such systems. The resultant sounds broadcast to the persons outside of the room 10 are completely masked with respect to the intelligibility represented by the spoken words.

As discussed in detail in Dudley Patent No. 2,151,091, words are obtained by various combinations of voiced and unvoiced sounds. The voiced sounds are represented by the vowels, such as "a," "e," "i," "o" and "u" and by various consonants requiring resonance of the voice box. For example, consonants such as the letters "m" and "n" are voiced sounds since they are produced with the aid of the vocal cords, which generate a buzz when air from the lungs is forced through the vocal cords.

Spoken words are formed by unvoiced sounds as well as voiced sounds. The unvoiced sounds include consonants which do not require any resonance of the vocal chords. Typical examples of unvoiced sounds are the consonants "f," "p" and "t." The unvoiced sounds are produced by blasts of air directly from the lungs, with the flow of air being either interrupted or restricted by the tongue, lips and teeth.

Since the unvoiced sounds are not formed from resonances of the vocal chords as are the voiced sounds, the unvoiced sounds have a shorter duration than the voiced sounds. Furthermore, the unvoiced sounds generally have higher frequencies than the voiced sounds. The unvoiced sounds may have frequencies above approximately 1500 cycles per second, whereas most of the information in the voiced sounds occurs at frequencies below 1500 cycles per second.

It will be appreciated that spoken words are distinguished by other features in addition to voiced and unvoiced sounds. For example, words are formed by the speaker and are understood by the listener because of the occurrence of sounds at the beginning of successive words or phrases. These transients or transitionals are primarily blasts of air used to start a syllable or a word or to couple successive sounds.

Certain sounds also are fricative in that they represent a combination of voiced and unvoiced sounds or a transition between the voiced and unvoiced sounds. Fricatives include the letter "z" and the sound "sh." Generally, however, if the voiced and unvoiced portions of the speech can be distinguished and reproduced, the speech can be understood by a listener, especially if some attempt is also made to reproduce the transients.

In the systems constituting this invention, the spoken words to be masked are preferably separated into the voiced and unvoiced sounds and signals are added to mask the voiced and unvoiced sounds. It will be appreciated, however, that the systems constituting this invention can also be practiced without separating the spoken words at each instant into voiced and unvoiced sounds and adding signals to mask the voiced and unvoiced sounds.

Figure 2:
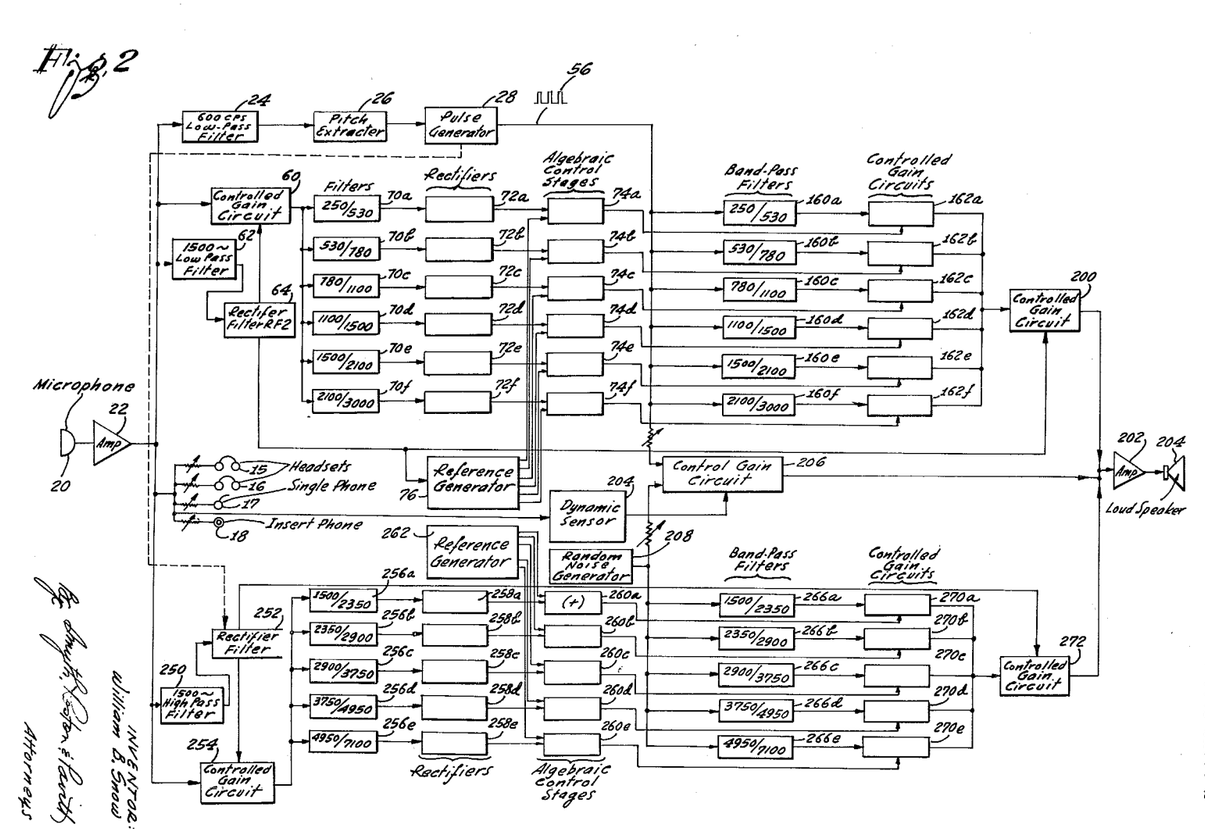
FIGURE 2 is a circuit diagram, substantially in block form, of one embodiment of the system constituting this invention.

In one embodiment of the systems constituting this invention, the spoken words are detected by a microphone 20, which is disposed within the room 10. The electrical signals produced by the microphone 20 may be introduced to headsets as at 15 and 16, to a telephone as at 17 and to an insert 18 for receiving a small earphone which may be disposed in the ear. Headsets and telephones are especially desirable when the room 10 is relatively large. If the persons 12 are relatively close to the speaker, it will be appreciated that the spoken words may be heard and understood without any need for such electrical aids as headsets and telephones.

The electrical signals produced by the microphone 20 are also amplified as at 22 and are introduced to stages including a low-pass filter 24 for operating upon the voiced portions of the spoken words. The filter 24 may be provided with characteristics to pass signals which have a frequency less than a particular value such as 600 cycles per second. The frequency of 600 cycles per second is chosen since the fundamental frequency of the words spoken by all persons, whether male or female or children, is less than 600 cycles per second. Generally, the fundamental frequency of the spoken sounds and two or more harmonics occur within a range of frequency up to 600 cycles per second.

The signals from the filter 24 are introduced to a pitch extractor 26 which is constructed to extract signals at the fundamental frequency from the sound such as speech which is produced in the room 10 at each instant. The signals extracted at the fundamental frequency by the stage 26 are then introduced to a pulse generator 28 which produces control signals 56 at the fundamental frequency. These signals preferably have sharp characteristics and a generally rectangular shape.

One embodiment of the extractor 26 and the pulse generator is discussed in an article entitled "Bandwidth Compression by Means of Vocoders" by Frank H. Slaymaker and is illustrated in FIGURE 10 of that article. The article is published on pages 20 to 26, inclusive, of the January-February, 1960, IRE Transactions on Audio.

Figure 3:
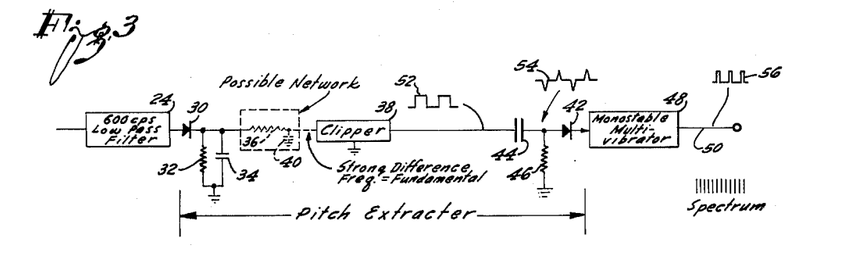
FIGURE 3 is a circuit diagram illustrating in some detail the construction of a pitch extractor and a pulse generator which are included in the embodiment shown in FIGURE 2.

Suitable embodiments of the pitch extractor 26 are also illustrated in some detail in FIGURE 3. As will be seen in FIGURE 3, the signals from the low-pass filter 24 are introduced to the anode of a diode 30, the cathode of which is connected to first terminals of a resistor 32 and a capacitor 34 in parallel. The second terminals of the resistor 32 and the capacitor 34 are connected to a suitable reference potential such as ground. The cathode of the diode 32 is also connected to one terminal of a resistor 36, the second terminal of which is connected to a clipper circuit 38. A capacitor 40 is also disposed between the second terminal of the resistor 36 and the reference potential such as ground.

The signals produced by the clipper 36 are introduced to a series circuit formed by a capacitor 44 and a resistor 46. The capacitor 44 and the resistor 46 constitute a differentiating circuit. One terminal of the resistor 46 is connected to a suitable reference potential such as ground. A connection is made to the anode of a diode 48 from the terminal common to the capacitor 44 and the resistor 46. The left input terminal of a multivibrator 48 has a common connection with the cathode of the diode 42. The multivibrator 48 may be provided with a conventional construction such as disclosed on pages 166 to 171, inclusive, of volume 19 entitled "Wave Forms" of the Radiation Laboratory Series prepared by the Massachusetts Institute of Technology and published by the McGraw-Hill Book Company, Inc., of New York City, in 1949. The multivibrator 48 may be provided with two stages which may be respectively designated as the "left" and "right" stages. Each of the stages in the multivibrator may be provided with an input terminal and an output terminal. Output signals may be produced on a line 50 from the right output terminal of the multivibrator.

The signals passing through the filter 24 are rectified by the diode 30 so that only the positive portions of the signals are introduced to the subsequent stages. The signals are then filtered by the resistor 32 and the capacitor 34. The resistor 32 and the capacitor 34 are provided with values to accentuate the low frequencies in the range of frequencies passed by the filter 34. The signals then pass through the stage including the resistor 36 and the capacitor 40 to produce a further accentuation of the low frequencies relative to the high frequencies in the range of frequencies passing through the filter 34. Because of the operation of the stage formed by the resistor 32 and the capicitor 34 and the stage formed by the resistor 36 and the capacitor 40, the beat frequency between the fundamental and the first harmonic also tends to be accentuated. Since this also constitutes the fundamental frequency, the signal produced across the capacitor 40 essentially has the fundamental frequency.

The signals produced across the capacitor 40 are introduced to the clipper 38, which in effect constitutes a saturation amplifier to produce a signal having a square wave as illustrated at 52 in FIGURE 3. The square wave illustrated at 52 in FIGURE 3 has the fundamental frequency. The signal 52 is differentiated by the capacitor 44 and the resistor 46 to produce triggering signals having a wave shape illustrated at 54 in FIGURE 3. Only the positive triggering signals are able to pass through the diode 42 to the left input terminal of the multivibrator 48 to trigger the multivibrator to a state of conductivity.

The multivibrator 48 is constructed so that its left stage is normally nonconductive and its right stage is normally conductive. When a positive triggering signal passes through the diode 42 to the left input terminal of the multivibrator 48, the left stage of the multivibrator becomes triggered to a state of conductivity. This causes the right stage of the multivibrator to become triggered to a state of nonconductivity because of the interconnections between the two stages.

When the right stage of the multivibrator 48 becomes triggered to a stage of nonconductivity, it remains nonconductive for a particular period of time dependent upon the characteristics of the multivibrator. At the end of the particular period, the right stage returns to a state of conductivity and the left stage becomes nonconductive. This prepares the multivibrator to become triggered by the next positive pulse which passes through the diode 42. In this way, signals having rectangular characteristics such as illustrated at 56 in FIGURE 3 are produced on the right output terminal of the multivibrator 48. The signals 56 are rich in the fundamental frequency of the intelligible sound and also in the harmonics of the fundamental because of their rectangular characteristics. The harmonics have substantially the same amplitude as the fundamental.

The signals produced by the amplifier 22 to represent the intelligible sound, such as speech in the room 10, are also introduced to a circuit 60 having a variable gain. The gain of the circuit 60 is controlled by signals which pass from the amplifier 22 through a filter 62 to a rectifier 64. The filter 62 may be constructed to pass signals having frequencies below a particular value, such as 1500 cycles per second. These signals are rectified by the stage 64 and are introduced to the circuit 60 to regulate the gain provided by the circuit. In this way, the circuit 60 tends to produce signals having a substantially constant level or intensity regardless of the intensity of the sound received by the microphone 20. In effect, the stages 60, 62 and 64 operate to convert sounds of variable intensity at successive instants of time into signals which have characteristics representing the characteristics of the sound at the successive instants of time but which have amplitudes corresponding to sounds of constant intensity. Since the gain of the stage 60 is controlled by the signals passing through the filter 62 at a maximum frequency of 1500 cycles per second, the gain of the stage 60 is controlled only by the voiced components of speech.

The speeches representing the intelligence of a substantially constant intensity pass through the circuit 60 to a plurality of filters 70a, 70b, 70c, 70d, 70e and 70f. Although six filters are shown by way of illustration in FIGURE 2, it will be appreciated that any different number of filters may also be used. Each of the filters 70a to 70f, inclusive, is constructed to pass signals in a different range of frequencies. For example, the filters 70a, 70b, 70c, 70d, 70e and 70f may respectively pass signals in the ranges of 250 to 530 cycles per second, 530 to 780 cycles per second, 780 to 1100 cycles per second, 1100 to 1500 cycles per second, 1500 to 2100 cycles per second and 2100 to 3000 cycles per second. As will be seen, the signals passed by the filters 70a to 70d, inclusive, occur in a frequency range which primarily transmits the intelligibility represented by the voiced aspects of speech. The signals passed by the filters 70e and 70f are in a frequency range which may be considered to contribute on a minor basis to the voiced aspects of speech.

Since the filters 70e and 70f provide only a secondary contribution, the range of frequencies passed by each of the filters 70e and 70f can be greater than the range of frequencies passed by each of the filters 70a to 70d, inclusive. Furthermore, the range of frequencies passed by each of the filters 70a to 70f, inclusive, tends to increase with increases in frequencies since the contributions made to the voiced aspects of speech by each of the filters tends correspondingly to decrease.

It will be appreciated that the number of individual filters corresponding to the filters 70a to 70f, inclusive, is only a matter of choice and that any different number of filters may also be used. It will also be appreciated that the range of frequencies chosen for each individual frequency is also only a matter of choice. However, it is believed that the number of filters and the range of frequencies selected for each filter provide an optimum performance of the system constituting this invention.

The signals from the filters 70a to 70f, inclusive, are respectively introduced to rectifiers 72a to 72f, inclusive. The rectifiers 72a to 72f, inclusive, may be constructed in a manner similar to that discussed above and indicated by the diode 30, the resistor 32 and the capacitor 34 in FIGURE 3. Each of the rectifiers 72a to 72f, inclusive, rectifies the signals introduced to it to produce signals having characteristics corresponding to the positive envelopes of the input signals. Although the stages 72a to 72f, inclusive, are designated as "rectifiers," it will be appreciated that they actually also provide a filtering action to produce direct voltages having magnitudes corresponding to the peak amplitudes of the alternating voltages introduced to the stages. The rectifiers 72d to 72f, inclusive may be constructed to provide direct voltages of positive or negative polarities.

The signals from the rectifiers 72a to 72f, inclusive, respectively pass to algebraic control stages 74a to 74f, inclusive, where they are combined with signal from a reference generator 76. The reference generator 76 is constructed to provide a particular pattern of voltages on a continuous basis or only during the times that the microphone 20 is receiving intelligible sounds within the room 10. Each of the different voltages produced by the reference generator 76 is introduced to a different one of the algebraic control stages 74a to 74f, inclusive. When the voltages are produced by the reference generator 76 on a continuous basis, no connection has to be made from the rectifier 64 to the reference generator 76. As illustrated in FIGURE 2, a connection is made from the rectifier 64 to the reference generator 76 when the reference generator produces reference voltages only upon the occurrence of speech in the room 10. This connection causes a voltage to be introduced to the reference generator 76 for activating the generator when one of the persons in the room 10 is speaking. The voltages produced by the reference generator 76 may be direct or alternating and may have either a positive or negative polarity when direct.

Figure 4:
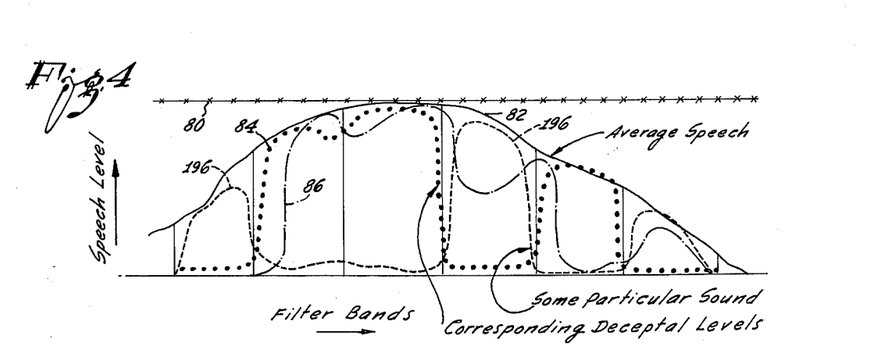
FIGURE 4 illustrates curves of the frequency pattern of speech and further illustrates how the system constituting this invention operates to complete voids in this frequency pattern.

The voltages introduced to each of the algebraic control stages 74a to 74f, inclusive, may have a magnitude substantially equal to that introduced to the other algebraic control stages, as illustrated at 80 in FIGURE 4. Preferably, however, the voltages produced by the reference generator 76 and introduced to the algebraic control stages 74a to 74f, inclusive, have a pattern of amplitude characteristics for the different frequencies as illustrated at 82 in FIGURE 4. The envelope 82 for the amplitudes of the voltages introduced by the reference generator 76 to the different algebraic control stages 74a to 74f, inclusive, is chosen since this constitutes the average pattern of amplitude vs. frequency in speech regardless of the words which are spoken and regardless of the person speaking at any instant.

The average pattern of amplitude vs. frequency in speech is substantially constant even though the particular frequencies of the speech occurring at any instant may be dependent upon the speaker and upon the words spoken at any instant. For example, the frequency of the speech at one instant may have a pattern 84 indicated by dotted lines in FIGURE 4. At another instant the patern of the frequencies may be different, as indicated at 86 in FIGURE 4 by dots and dashes. However, it will be seen that both the patterns 84 and 86 fit within the envelope 82 to indicate that the amplitudes of the signals at the different frequencies conform to the envelope 82.

The envelope 82 is discussed on pages 80 to 83 of "Speech and Hearing in Communication" by Harvey Fletcher. Constituting one of the Bell Laboratory Series, this book was published by D. von Nostrand & Company in 1953. Curves corresponding to the envelope 82 are illustrated in FIGURES 62 to 65, inclusive, of the Fletcher book.

Each of the algebraic control stages 74a to 74f, inclusive, produces an output voltage at each instant in accordance with the amplitude of the signals passing through the rectifiers 72a to 72f, inclusive, and the amplitude of the voltage from the reference generator 76. Each of the algebraic control stages 74a to 74f, inclusive, may operate in one of two ways with the same ultimate result. For example, when one type of algebraic control stage is used as the stage 74a, the amplitude of the voltage produced by the reference generator 76 and introduced to the stage 74a may be reduced from relatively high levels in accordance with the amplitude of the signal from the rectifier 72a. With this type of algebraic control stage 74a, the amplitude of the voltage passing through the algebraic control stage becomes progressively reduced as the amplitude of the voiced aspects of the speech in the range of 250 to 530 cycles per second increases.

In the second type of algebraic control stage 74a, the amplitude level of the signals from the reference generator 76 is normally low. Under such circumstances, the level of the signals from the reference generator 76 becomes increased as the amplitude of the signal from the rectifier filter 72a decreases. In other words, the amplitude of the voltage passing through the stage 74a from the reference generator 76 increases as the amplitude of the voiced aspects of the speech in the range of 250 to 530 cycles per second decreases.

Various embodiments of the algebraic control stages 74a to 74f, inclusive, are illustrated in FIGURES 5, 6, 7 and 8. In the embodiment shown in FIGURE 5, the output of an algebraic control stage such as the stage 74a is relatively high. The output of the stage 74a is reduced from the high level in accordance with the occurrence of speech signals in the range of 250 to 530 cycles per second. In the embodiment shown in FIGURE 5, the signals from the reference generator 76 are introduced to one terminal of a potentiometer 90 in the stage 74a, the second terminal of the stage 74a being connected to a suitable reference potential such as ground. The reference generator is constructed to introduce a negative voltage to the potentiometer 90 and the movable arm of the potentiometer is adjustable to produce a voltage corresponding to the average amplitude of the curve 82 in FIGURE 4 in the frequency range of 250 to 530 cycles per second.

Figure 5:
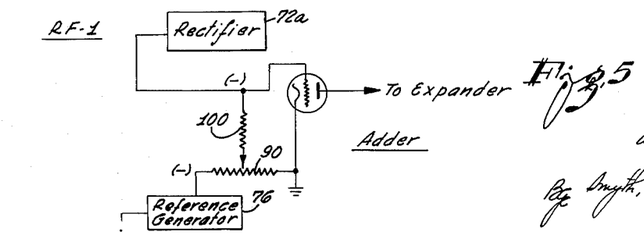
FIGURES 5 to 8, inclusive, constitute different embodiments of an algebraic control stage included in the embodiment shown in FIGURE 2.

The movable arm of the potentiometer 90 has a common connection with one terminal of a resistance 100, the second terminal of which is connected to the output terminal of the rectifier 72a. Connection is also made from the output terminal of the rectifier 72a to the control element of a current control member such as the grid of a vacuum tube 102. The cathode of the tube 102 is at the reference potential such as ground. The output is obtained from the plate of the tube 102.

As previously described, the movable arm of the potentiometer 90 is set to produce a voltage corresponding to the average level of the curve 82 in FIGURE 4 in the frequency range of 250 to 530 cycles per second. This voltage biases the grid of the tube 102 to produce a particular flow of current through the tube. The bias on the grid of the tube is varied in accordance with the direct voltage from the rectifier 72a. For example, the rectifier 72a introduces a negative voltage to the grid of the tube 102 when voiced aspects of speech occur in the room 10 in the frequency range of 250 to 530 cycles per second. The negative bias introduced to the grid of the tube 102 from the rectifier 72a increases as the voiced aspects of the speech in the frequency range of 250 to 530 cycles per second increase. This negative bias decreases the current through the tube 102. The output of the stage connected to the plate of the tube 102 constitutes an expander in which the amplitude of the stage increases as the current from the tube 102 increases. In this way, the amplitude of the output signals from the expander decreases as the voiced aspects of the speech in the room 10 increase.

Figures 6, 7, 8, 9, 11, 12:
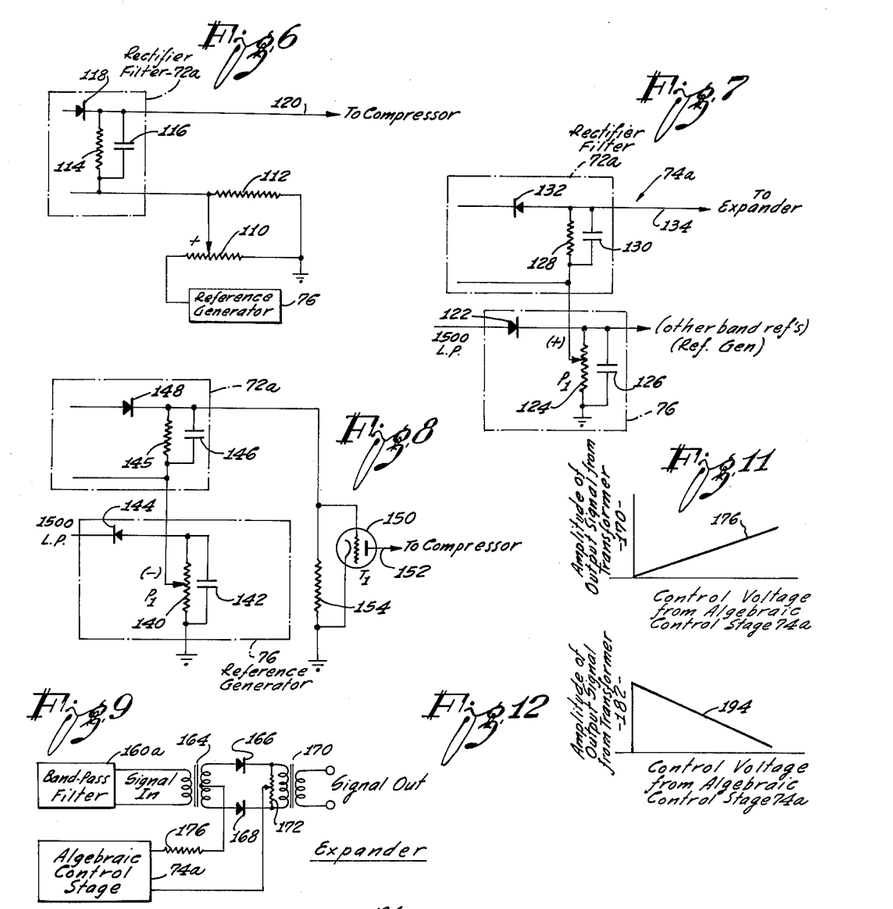
FIGURE 9 is a circuit diagram illustrating the construction of controlled gain stages included in the embodiment shown in FIGURE 2 when the controlled gain stages constitute expanders.
FIGURE 11 illustrates curves showing the operation of the controlled gain stage of FIGURE 9 when control signals of progressively increasing amplitude are introduced to the controlled gain stage.
FIGURE 12 illustrates curves showing the operation of the controlled gain stage of FIGURE 10 when control signals of progressively increasing amplitudes are introduced to the controlled gain stage.

In the embodiment shown in FIGURE 6, the reference generator 76 is constructed to produce a positive voltage and is connected to a potentiometer 110 to introduce the positive voltage to the potentiometer. The movable arm of the potentiometer 110 is adjustable to provide a voltage which corresponds to the average level of the curve 82 in FIGURE 4 in the frequency range of 250 to 530 cycles per second. The movable arm of the potentiometer 110 is connected to one terminal of a resistor 112, the second terminal of which is at a suitable reference potential such as ground.

Connections are also made from the movable arm of the potentiometer 110 to first terminals of a resistor 114 and a capacitor 116. The resistor 114 and the capacitor 116 form the rectifier 72a with a diode 118. The diode 118 has its cathode connected to the second terminals of the resistor 114 and the capacitor 116 to pass a positive voltage. The cathode of the diode 118 is connected to an output line 120.

A positive potential of substantially constant amplitude is produced on the movable arm of the potentiometer 110 to represent the average level of the curve 82 in FIGURE 4 in the frequency range of 250 to 530 cycles per second. This potential is produced on the output line 120 when no component occurs in the voiced aspects of speech in the room 10 in the frequency range of 250 to 530 cycles per second. The positive potential on the output line 120 becomes increased in accordance with the occurrence of the voiced aspects of the speech in the room 10 in the frequency range of 250 to 530 cycles per second. The voltage on the output line 120 controls the operation of a compressor such that the output from the compressor becomes reduced as the voltage on the line 120 increases. In this way, the amplitude of the output signals from the compressor becomes reduced as the amplitude of the voiced aspects of speech increases.

Both of the embodiments shown in FIGURES 5 and 6 are similar in that the outputs from the stages following the stages shown in FIGURES 5 and 6 are normally at a relatively high level. The embodiments of the algebraic control stages shown in FIGURES 5 and 6 are further similar in that the outputs of the stages following these embodiments become reduced from the high levels upon the occurrence of voiced aspects of speech in the room 10 in a particular frequency range such as 250 to 530 cycles per second. The embodiment shown in FIGURE 6 has an advantage over the embodiment shown in FIGURE 5 because it has a fail-safe feature which does not necessarily occur in the embodiment shown in FIGURE 5. This results from the fact that the compressor connected to the output line 120 provides signals at a relatively high level in case no signals are able to pass through the rectifier formed by the resistor 114, the capacitor 116 and the diode 118 because of a malfunctioning of the rectifier or a prior stage.

In the embodiments shown in FIGURES 5 and 6, the outputs of the stages following the stages shown in FIGURES 5 and 6 are normally at relatively high levels and become reduced in accordance with the occurrence of the voiced aspects of speech in a particular frequency range such as 250 to 530 cycles per second. When the embodiments shown in FIGURES 7 and 8 are used, the outputs of the stages following the embodiments shown in FIGURES 7 and 8 are normally at relatively low levels. The outputs of the stages following the embodiments shown in FIGURES 7 and 8 become increased when no voiced aspects of speech occur in the room 10 in a particular frequency range such as 250 to 530 cycles per second.

In the embodiment shown in FIGURE 7, the reference generator 76a may be considered to include a diode 122, a potentiometer 124 and a capacitor 126. First terminals of the potentiometer 124 and the capacitor 126 are connected to the cathode of the diode 122 to provide a positive potential. The second terminals of the potentiometer 124 and the capacitor 126 are at the reference potential such as ground. The movable arm of the potentiometer 124 is adjusted to provide a voltage with a magnitude corresponding to the average level of the curve 82 in a particular frequency range such as 250 to 530 cycles per second.

The movable arm of the potentiometer 124 is connected to first terminals of a resistor 128 and a capacitor 130 in parallel. The resistor 128 and the capacitor 130 are included with a diode 132 in a rectifier and filter arrangement corresponding to a particular one of the rectifiers and filters such as the rectifier 72a in FIGURE 2. An output line 134 is connected to the anode of the diode and to the second terminals of the resistor 120 and the capacitor 130 to receive a negative voltage.

When no voiced aspects of speech occur in the room 10 in a particular frequency range such as 250 to 530 cycles per second, the positive voltage on the movable arm of the potentiometer 124 appears on the output line 134. This output line is connected to an expander which provides an output signal in accordance with the magnitude of the voltage on the line 134. The output signal from the expander connected to the output line 134 increases as the positive voltage on the line 134 increases. Because of this, the output from the expander connected to the line 134 is greater when no voiced aspects of speech occur in the room 10 in a particular frequency range such as 250 to 530 cycles per second than when voiced aspects of speech occur in the room 10 in the particular frequency range. This results from the fact that a negative voltage is introduced to the line 134 when voiced aspects of speech occur in the room 10 in the particular frequency range such as 250 to 530 cycles per second.

In the embodiment shown in FIGURE 8, the reference generator 76 includes a potentiometer 140, a capacitor 142 and a diode 144. First terminals of the potentiometer 140 and the capacitor 142 are connected to the plate of the diode 144 to receive a negative voltage. The second terminals of the potentiometer 140 and the capacitor 142 are at the reference potential such as ground. The movable arm of the potentiometer 140 is adjusted in position to provide a voltage corresponding to the average level of the curve 82 in FIGURE 4 in a particular frequency range such as 250 to 530 cycles per second. The movable arm of the potentiometer 140 is connected to first terminals of a resistor 145 and a capacitor 146.

The resistor 145 and capacitor 146 are included with a diode 148 in a rectifier and a filter corresponding to one of the rectifiers 72a to 72f, inclusive, such as the rectifier 72a. The diode 148 is connected to pass a positive voltage such that the cathode of the diode is connected to the second terminals of the resistor 145 and the capacitor 146.

A connection is also made from the cathode of the diode 148 to the grid of a tube 150 and to one terminal of a resistor 154, the second terminal of which is at the reference potential such as ground. The cathode of the tube 150 is also at the reference potential such as ground. The plate of the tube 150 is connected to an output line 152 which extends electrically to the following stage. This following stage is constructed as a compressor to reduce the amplitude of its output signal as the current through the tube 150 increases.

The grid of the tube 150 is biased to a negative potential by the voltage on the movable arm of the potentiometer 140. This causes the compressor stage connected to the output line 152 to produce a relatively large output when no voiced aspects of speech occur in the room 10 in a particular range of frequency, such as 250 to 530 cycles per second. Upon the occurrence of voiced aspects of speech in the particular range of frequencies, a positive voltage is introduced through the diode 148 to the grid of the tube. The magnitude of this positive voltage is dependent upon the intensity of the voiced aspects of speech in the particular range of frequencies. This positive voltage causes the current through the tube 150 to increase and the signal at the output of the stage connected to the output line 152 to decrease.

It will be seen that the embodiments shown in FIGURES 7 and 8 operate to produce a relatively large amplification of a signal from a low level when no voiced aspects of speech occur in the room 10 in a particular range of frequencies such as 250 to 530 cycles per second. The embodiments shown in FIGURES 7 and 8 operate to decrease the amplification when the voiced aspects of speech occur in the room 10 for the particular frequency range such as 250 to 530 cycles per second.

The embodiment shown in FIGURE 8 is advantageous over the embodiment shown in FIGURE 7 because it is relatively fail-safe. One reason is that a failure of the embodiment shown in FIGURE 8 to receive signals representing the voiced aspects of speech in the room 10 in the particular range of frequencies causes the stage connected to the output line 152 to produce signals of relatively great amplification. In this way, the embodiment shown in FIGURE 8 would tend to produce signals masking the intelligibility of the speech if the stages such as the filters 70a to 70f and the rectifiers 72a to 72f became damaged.

As previously described, the pulse generator 28 produces signals having rectangular characteristics as illustrated at 56 in FIGURE 3. Because of the rectangular characteristics, the signals 56 are rich in harmonics. The signals 56 are introduced to a plurality of band-pass filters 160a to 160f, inclusive. The band-pass filters 160a to 160f, inclusive are respectively provided with frequency characteristics corresponding to those of the band-pass filters 70a to 70f, inclusive. This causes signals having different ranges of frequencies to pass through the filters 160a to 160f, inclusive, to controlled gain circuits 162a to 162f, inclusive. The controlled gain circuits 162a to 162f, inclusive, also respectively receive control voltages from the algebraic control stages 74a to 74f, inclusive.

Each of the controlled gain circuits 162a to 162f, inclusive, is constructed to pass a portion of the signals from the associated one of the band-pass filters 160a to 160f, inclusive, in accordance with the control voltage from the associated one of the algebraic control stages 74a to 74f, inclusive. When the algebraic control stages 74a to 74f, inclusive, are constructed in a manner similar to the embodiments shown in FIGURES 5 and 7, the controlled gain circuits 162a to 162f, inclusive, operate to produce signals of increased amplitude as the control voltages from the algebraic control stages 74a to 74f, inclusive, increase. When the embodiments shown in FIGURES 6 and 8 are used as the algebraic control stages 74a to 74f, inclusive, the amplitudes of the signals passed by the control gain circuits 162a to 162f, inclusive, decrease as the control voltages from the associated algebraic control stages increase.

The ultimate effect is the same whether the embodiments shown in FIGURES 5, 6, 7 or 8 are used as the algebraic control stages 74a to 74f, inclusive. Under all circumstances, the controlled gain circuits 162a to 162f, inclusive, pass increased amplitudes of signals from the band-pass filters 160a to 160f, inclusive, as the voiced aspects of speech decrease for the particular range of frequencies at which the controlled gain circuits are responsive. For example, as the voiced aspects of the speech in the room 10 in the frequency range of 250 to 530 cycles per second decrease, the controlled gain circuit 162a passes an increased portion of the signals from the band-pass filter 160a. The controlled gain circuit 162a operates in this manner to bring the level of the signals produced by the system constituting this invention to the level of the envelope 82 in the portion of the frequency range between 250 and 530 cycles per second.

The controlled gain circuits 162a to 162f, inclusive, may have constructions which depend upon the type of embodiments used for the algebraic control stages 74a to 74f, inclusive. For example, when the algebraic control stages 74a to 74f, inclusive, have the construction illustrated in FIGURE 5 or in FIGURE 7, the controlled gain circuits 162a to 162f, inclusive, may have the construction shown in FIGURE 9. Similarly, the controlled gain circuits may have the construction shown in FIGURE 10 when the algebraic control stages have the construction shown in FIGURE 6 or in FIGURE 8. It will also be appreciated that the controlled gain circuits 162a to 162f, inclusive, may have constructions other than those illustrated in FIGURES 9 and 10.

The controlled gain circuit illustrated in FIGURE 9 includes an input transformer 164, the primary winding of which is connected to receive the signals from a particular one of the filters 160a to 160f, inclusive. In the embodiment shown in FIGURE 9, the primary winding of the transformer 164 is illustrated as receiving the signals from the band-pass filter 160a.

The secondary winding of the transformer 164 has its end terminals respectively connected to the plates of diodes 166 and 168. The diodes 166 and 168 are provided with a variable resistance dependent upon the voltages applied to the diodes. Such diodes are generally designated as "Varisters" and may be crystal diodes with a wide frequency range.

The cathodes of the diodes 166 and 168 are respectively connected to end terminals of the primary winding in a transformer 170. A potentiometer 172 may be connected across the primary winding of the transformer 170. The movable arm of the potentiometer 172 and a center tap on the secondary winding of the transformer 164 may then be connected to the output terminals of the algebraic control stage 74a. Instead of providing the potentiometer 172, the primary winding of the transformer 170 may be provided with a center tap which is connected to the output terminal of the algebraic control stage 74a. A resistor 176 may be connected between the center tap of the secondary winding in the transformer 164 and the algebraic control stage 74a.

The movable arm of the potentiometer 172 is adjusted to produce equal voltages on the movable arm and on the center tap of the secondary winding in the transformer 164 when no control voltage is introduced from the algebraic control stage 74a. The potentiometer 172 is included to compensate for variations in the characteristics of the elements in the embodiment illustrated in FIGURE 9. The movable arm of the potentiometer is adjustable to produce optimum compensations for variations from the ideal characteristics of the elements in the embodiment shown in FIGURE 9. The construction and operation of the embodiment shown in FIGURE 9 are disclosed in detail in Patent No. 2,258,662 issued to me.

Since the movable arm of the potentiometer 172 and the center tap on the secondary winding of the transformer 164 are at equal potentials during the absence of a control voltage from the algebraic control stage 74a, no potential difference is produced across the primary winding of the transformer 170. This prevents an output signal from being induced in the secondary winding of the transformer 170. Because of this, no output signal is introduced from the controlled gain circuit 162a to the stages following the controlled gain circuit.

Upon the introduction of a control voltage from the algebraic control stage to produce a voltage difference between the center tap of the secondary winding on the transformer 164 and the movable arm of the potentiometer 172, a voltage is produced across the diodes 166 and 168. The magnitude of this voltage is dependent upon the magnitude of the voltage from the algebraic control stage 74a. As the magnitude of the voltage across the diodes 166 and 168 varies, the resistance of the diodes varies in an inverse relationship. For example, the resistance of the diodes 166 and 168 decreases as the voltage across the diodes increases.

Since the resistance across the diodes 166 and 168 decreases as the magnitude of the control voltage from the stage 74a increases, an increased portion of the signals from the bandpass filter 160a is able to pass through the diodes 166 and 168 to the primary winding of the transformer 170. This causes the gain of the signals produced by the embodiment shown in FIGURE 9 to increase as the control voltage increases. This may be seen from the curve 176 illustrated in FIGURE 11. In FIGURE 11, the control voltage from the stage 74a is illustrated along the abscissa and the amplitude of the output signal across the secondary winding of the transformer 170 is illustrated along the ordinate. As will be seen, the amplitude of the output signal increases on a somewhat linear basis as the control voltage from the stage 74a increases. Since the control voltage from the stage 74a increases with decreases in the voiced aspects of the speech in the room 10 in the range of 250 to 530 cycles per second, the output signal across the secondary winding of the transformer 170 correspondingly increases.

Figure 10:
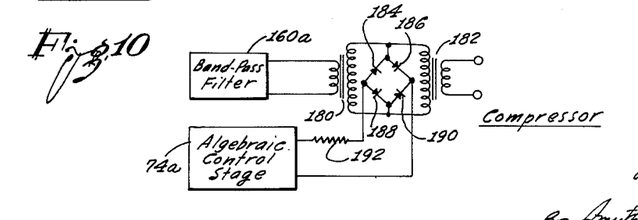
FIGURE 10 is a circuit diagram illustrating the construction of controlled gain stages in the embodiment shown in FIGURE 2 when the controlled gain stages constitute compressors.

The embodiment shown in FIGURE 10 of the controlled gain circuits 162a to 162f, inclusive, is adapted to operate with the embodiments shown in FIGURES 6 and 8 of the algebraic control stages 74a to 74f, inclusive. As will be seen from the curve 194 illustrated in FIGURE 12, the embodiment shown in FIGURE 10 is adapted to produce output signals of decreasing amplitude as the control signal from the algebraic control stages such as the stage 74a increases. In this sense, the embodiment shown in FIGURE 10 operates as a compressor to decrease the amplitude of the output signals with increases in the control voltage from the stage 74a. This is opposite to the embodiment shown in FIGURE 9, which operates as an expander to increase the amplitude of the output signals with increases in the control voltage from the stage 74a.

The embodiment shown in FIGURE 10 includes a transformer 180, the primary winding of which is connected to one of the band-pass filters 160a to 160f, inclusive, such as the band-pass filter 160a. The secondary winding of the transformer 180 is connected to the primary winding of a transformer 182. Output signals are obtained from the secondary winding of the transformer 182.

A bridge circuit formed from a plurality of diodes 184, 186, 188 and 190 is connected across the secondary winding of the transformer 180. The cathode of the diode 184 and the anode of the diode 186 have a common terminal with one terminal of the secondary winding in the transformer 180. In like manner, the cathode of the diode 188 and the anode of the diode 190 have a common connection with the second terminal of the secondary winding in the transformer 180. The anodes of the diodes 184 and 188 are connected directly or through a resistance 192 to one terminal of the algebraic control stage 74a. Connections are made from the cathode of the diode 186 and the cathode of the diode 190 to the second terminal of the algebraic control stage 74a.

The diodes 184, 186, 188 and 190 are provided with characteristics similar to the characteristics of the diodes 166 and 168 in the embodiment shown in FIGURE 9. Because of this, the diodes 184, 186, 188 and 190 have relatively high impedances when no control voltage is produced by the algebraic control stage 74a. This causes substantially all of the signals from the band-pass filter 160a to pass from the secondary winding of the transformer 180 to the primary winding of the transformer 182.

As the amplitude of the signal from the algebraic control stage 74a increases, the impedances of the diodes 184, 186, 188 and 190 decrease so as to decrease the impedance across the primary winding of the transformer 182. The decrease in the impedances of the diodes 184, 186, 188 and 190 provides a shunt path across the primary winding of the transformer 182 such that a decreasing portion of the signal in the secondary winding of the transformer 180 is introduced to the primary winding of the transformer 182. This causes the embodiment shown in FIGURE 10 to have a decreasing gain with increases in the amplitude of the signal from the algebraic control stage 74a, as indicated by the curve 194 in FIGURE 12.

The signals passed by each of the controlled gain circuits 162a to 162f, inclusive fill the voids in the curve 82 in FIGURE 4. These voids result from the frequency spectrum of the voiced aspects of the speech in the room 10 at each instant. For example, when the voiced aspects of the speech in the room 10 have the frequency characteristics illustrated at 84 in FIGURE 4, the signals passed by the controlled gain circuits 162a to 162f, inclusive, have the frequency characteristics illustrated at 196 in FIGURE 4. The curves 84 and 196 combine to define the envelope 82 in FIGURE 4.

As previously described, the intensity of the speech may vary at successive instants of time. As described in detail previously, the intensity of the speech is detected by the rectifier 64 so as to regulate the gain of the signals passing through the controlled gain circuit 60 to the filters 70a to 70f, inclusive. Furthermore, the signals produced by the pulse generator 28 also have a substantially constant amplitude. This causes the signals passing through the controlled gain circuits 162a to 162f, inclusive, to have a regulated amplitude regardless of the intensity of the sounds in the room 10 at each instant.

The signals from the controlled gain circuits 162a to 162f, inclusive, are introduced to a controlled gain circuit 200, the operation of which is controlled by the voltage from the rectifier 64. The voltage from the rectifier 64 varies the amplitude of the signals passing through the circuit 200 in accordance with the intensity of the voiced aspects of the speech in the room 10 at each instant. The signals from the controlled gain circuit 200 are introduced through an amplifier 202 to a loud speaker 204.

The loud speaker 204 broadcasts sounds such as those corresponding to the curve 196 in FIGURE 4. These sounds become mixed with the speech emanating from the room 10 at each instant, as represented by the curve 84 in FIGURE 4. The resultant sounds heard by listeners outside the room have the frequency spectrum 82 in FIGURE 4 at each instant. This prevents the sounds from being intelligible to the listeners outside of the room 10.

It has been found that understanding of speech is obtained in considerable measure from the dynamics of the successive words in the speech. For example, the transients at the beginning and end of successive words are important in providing and insuring intelligibility of the speech to a listener. Because of this, special attention may be devoted in the system constituting this invention to insure that the dynamic aspects of the speech in the room 10 become particularly masked. The masking of the dynamic aspects of speech is provided by a dynamic sensor 204 which produces signals at the instant of dynamic changes in the speech in the room 10 such as at the beginning and end of successive words.

The signals produced by the dynamic sensor 204 to represent transients are introduced to a controlled gain circuit 206 having a construction similar to that of the controlled gain circuits 162a to 162f, inclusive. The controlled gain circuit 206 also receives the signals 56 from the pulse generator 28 and passes a portion of the signals in accordance with the voltage at each instant from the dynamic sensor 204.

Signals from a random noise generator 208 may also be introduced to a controlled gain circuit 206 for mixing with the signals from the pulse generator 28. The signals from the random noise generator 208 are introduced to the controlled gain circuit 206 so that noise will also pass through the circuit at the instant when dynamic changes occur in the speech in the room 10 such as at the beginning and end of successive words. The signals passing through the circuit 206 from the pulse generator 28 and the random noise generator 208 are introduced through the amplifier 202 to the loud speaker 204 so as to be broadcast as sounds to the listeners outside of the room 10.

Figure 13:
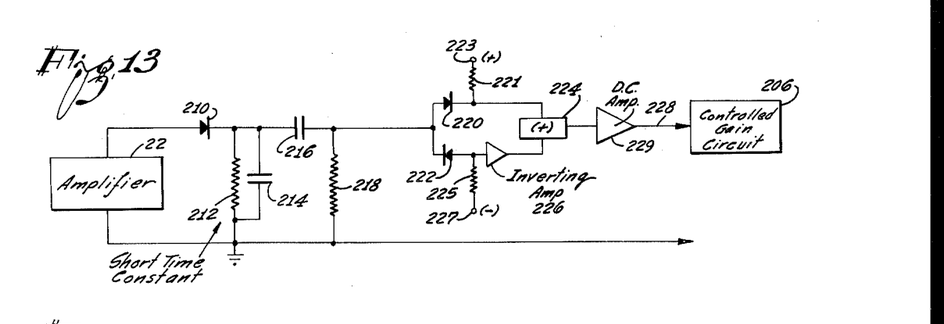
FIGURE 13 is a circuit diagram of a dynamics sensor included in the embodiment shown in FIGURE 2.

One embodiment of the dynamic sensor 204 is illustrated in some detail in FIGURE 13. The embodiment shown in FIGURE 13 includes a diode 210, the anode of which is connected to the amplifier 22 to receive signals having characteristics corresponding to the words spoken in the room 10. A resistor 212 and a capacitor 214 are in parallel between the cathode of the diode 210 and the reference potential such as ground. A capacitor 216 and a resistor 218 are in series between the cathode of the diode 210 and the reference potentiometer such as ground to define a differentiator.

The terminal common to the capacitor 216 and resistor 218 is connected to the plate of a diode 220 and to the cathode of a diode 222. The cathode of the diode 220 is positively biased through a resistor 221 from a source 223 of direct voltage. The cathode of the diode 220 has a common connection with one terminal of a gate 224 which may constitute an amplifier to pass only positive signals. The anode of the diode 222 is negatively biased through a resistor 225 from a source 227 of direct potential. The negative signals on the anode of the diode 222 are inverted by an amplifier 226 into a positive voltage and are introduced in their inverted form to another input terminal of the gate 224. The output signals from the gate 224 are amplified by a stage 229 and are introduced through an output line 228 to the controlled gain circuit 206.

The signals representing the words spoken in the room 10 are introduced from the amplifier 22 to the diode 210 and are rectified by the diode so that only the signals of positive polarity are able to pass. The positive signals are then filtered by the resistor 212 and the capacitor 214 so that a direct voltage having a magnitude corresponding to the amplitude of the signals from the amplifier 22 is produced.

Figure 14:
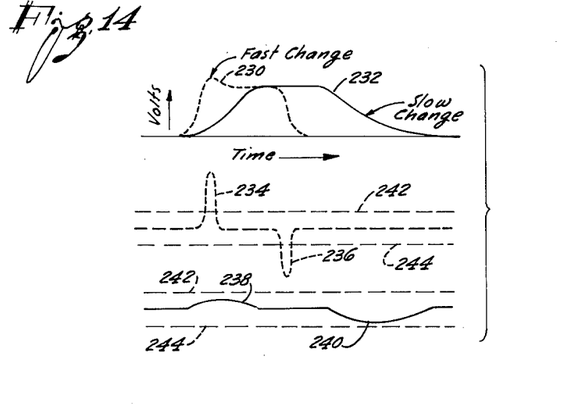
FIGURE 14 illustrates curves showing the operation of the dynamics sensor of FIGURE 13.

The direct voltage on the cathode of the diode 210 may have characteristics illustrated at 230 in FIGURE 14 when relatively great dynamic changes occur in the speech in the room 10 such as at the beginning and end of spoken words. The direct voltage produced at the cathode of the diode 10 at successive instants of time may have characteristics similar to those indicated at 232 in FIGURE 14 when relatively small dynamic changes occur in the speech in the room 10.

The direct voltage produced at the cathode of the diode 10 at successive instants of time is differentiated by the capacitor 216 and the resistor 218. The resultant signals produced at the terminal common to the capacitor 216 and the resistor 218 have an amplitude dependent at each instant upon the rate of change of the signals on the cathode of the diode 210.

For example, the signal produced at the terminal common to the capacitor 216 and the resistor 218 has a positive polarity and a relatively high amplitude during the time that the signal 230 is rising from zero to a peak amplitude. This is illustrated at 234 in FIGURE 14. The signal produced at the terminal common to the capacitor 216 and resistor 218 has a negative polarity and a relatively high amplitude, as illustrated at 236 in FIGURE 14, during the time that the signal 230 is decreasing rapidly from a relatively high amplitude to a value of zero. This is in contrast to the signal 238 produced at the terminal common to the capacitor 216 and the resistor 218 when the signal 232 is rising at a relatively slow rate from the value of zero toward the peak amplitude. A negative signal 240 having a relatively low amplitude is correspondingly produced at the terminal common to the capacitor 216 and the resistor 218 during the time that the signal 232 is decreasing at a relatively slow rate toward a value of zero.

The differentiated signal of positive polarity passes through the diode 220 and the gate 224 to the amplifier 226 to control the operation of the controlled gain circuit 206. By providing a positive bias on the cathode of the diode 220 through the resistor 221, only the signals of positive polarity above a particular amplitude level are able to pass through the diode from the differentiator formed by the capacitor 216 and the resistor 218. This amplitude level is indicated at 242 in FIGURE 14. As will be seen in FIGURE 14, the signal 234 is able to pass through the diode 220 to the gate 224 but the signal 238 is not able to pass through the diode because of the bias provided by the resistor 221. In this way, only the signals representing relatively great dynamic changes in the speech in the room 10 are able to be introduced to the controlled gain circuit 206 to obtain an output from the circuit.

In like manner, only the signals of negative polarity above a particular amplitude are able to pass through the diode 222 because of the bias provided by the resistor 225 and the source 227. This amplitude is indicated at 244 in FIGURE 14. This prevents signals such as the signal 240 from passing through the diode 222. The signals passing through the diode 222 are inverted to a positive polarity by the amplifier 226 so as to pass through the gate 224. These signals are also instrumental in obtaining a controlled output from the circuit 206.

The unvoiced aspects of speech generally occur in the frequency range above 1,500 cycles per second. Because of this, the signals passing through the amplifier 22 are introduced to a filter 250 which is provided with characteristics to pass the relatively high frequencies such as the frequencies about 1,500 cycles per second. The signals representing the unvoiced aspects of speech are introduced from the filter 250 to a stage 252 which constitutes a rectifier and a filter. The output from the stage 252 has at each instant a magnitude representing the intensity of the unvoiced aspects of the speech in the room 10 at that instant. This signal is introduced to a controlled gain circuit 254 corresponding to the circuit 60 for the voiced aspects of speech. The controlled gain circuit is instrumental in regulating the intensity of the unvoiced aspects of the speech which pass from the amplifier 22 through the circuit 254 to a plurality of band-pass filters such as filters 256a, 256b, 256c, 256d and 256e.

Each of the filters 256a to 256e, inclusive, may be provided with characteristics to pass the signals in a different range of frequencies. For example, the filters 256a, 256b, 256c, 256d and 256e may be respectively constructed to pass signals in the ranges of 1,500 to 2,350 cycles per second, 2,350 to 2,900 cycles per second, 2,900 to 3,750 cycles per second, 3,750 to 4,950 cycles per second and 4,950 to 7,100 cycles per second. The frequency ranges of the signals passed by the filters 256d and 256e are greater than the frequency ranges of the signals passed by the filters 256a, 256b and 256c since the unvoiced aspects of the speech tend to diminish in their effect upon the listener as the frequency increases.

The signals from the band-pass filters 256a and 256e, inclusive, are respectively introduced to rectifiers 258a to 258e, inclusive. The rectifiers 258a to 258e, inclusive, may actually include filters and perform functions similar to the rectifiers 72a to 72f, inclusive, which have been described above for the voiced aspects of speech. The signals from the rectifiers 258a to 258e, inclusive, pass to algebraic control stages 260a to 260e, inclusive, which correspond in construction and operation to the algebraic control stages 74a to 74f, inclusive. The algebraic control stages 260a and 260e, inclusive, also receive signals from a reference generator 262, which corresponds in construction and operation to the reference generator 76. The construction and operation of the reference generator 76 and the algebraic control stages 260a to 260e, inclusive, have been described in detail in connection with the voiced aspects of speech.

A plurality of band-pass filters 266a to 266e, inclusive, are also provided for the unvoiced aspects of speech and are provided with functions equivalent to the functions of the filters 160a to 160f, inclusive, which have been described above for the voiced aspects of speech. The filters 266a to 266e, inclusive, constitute band-pass stages with frequency responses corresponding respectively to the frequency responses of the filters 256a to 256e, inclusive. The filters 266a to 266e, inclusive, are shown in FIGURE 2 as receiving signals from the random noise generator 208, although it will be appreciated that the filters may also receive signals from a pulse generator corresponding to the pulse generator 28, which has been described above for the voiced aspects of speech. The random noise generator 208 may be used for the unvoiced aspects of speech since the unvoiced energy in speech is "generated" by air turbulence and is of random character.

The signals from the filters 266a to 266e, inclusive, are respectively introduced to controlled gain stages 270a to 270e, inclusive, which may be constructed in a manner similar to that described above for the controlled gain stages 162a to 162f, inclusive. The signals from the algebraic control stages 260a to 260e, inclusive, are also introduced to the controlled gain stages 270a to 270e, inclusive, to control the amplitude of the signals passing through the controlled gain stages at each instant from the band-pass filters 266a to 266e, inclusive. The resultant signals passing through the controlled gain stages 270a to 270e, inclusive, have amplitudes which fill the voids in the envelope 82. These voids occur in a variable pattern in accordance with the frequency pattern of the unvoiced aspects of the speech in the room 10 at each instant. The voids represent the difference between the envelope 82 and the intensity of the unvoiced aspects of speech at the different frequencies.

The signals passing through the controlled gain stages 270a to 270e, inclusive, are introduced to a controlled gain stage 272 which has a construction similar to that of the controlled gain stages 270a to 270e, inclusive. The controlled gain stage 272 performs a function similar to that of the controlled gain stage 200, which has been described above in connection with the voiced aspects of speech. The controlled gain stage 272 varies the amplitude of the signals passing through the stage from the stages 270a to 270e, inclusive, in accordance with the intensity of the voiced aspects of speech at each instant. This intensity of the voiced aspects of speech at each instant is indicated by the magnitude of the signal from the rectifier 252 at that instant.

The signals from the controlled gain circuit 272 are introduced through the amplifier 202 to the loud speaker 204 so as to be broadcast to the listeners outside of the room 10. These signals are combined with the unvoiced aspects of speech passing from the room 10 at each instant so as to mask the intelligibility of the unvoiced aspects of the speech. The resultant sounds heard by the listeners outside of the room 10 have a pattern corresponding to the envelope 82 at each instant.

It may be desired to have signals pass through the controlled gain circuit 272 only during the times that speech is actually occurring in the room 10 even though the random noise generator 208 is producing signals on a continuous basis. When the embodiments shown in FIGURES 9 and 10 are used for the controlled gain circuits 270a to 270e, inclusive, and the controlled gain circuit 272, signals from the random noise generator 208 pass on a continuous basis through the circuit 272 such that signals in the frequency range of the unvoiced aspects of speech are continuously broadcast by the loudspeaker 204.

Figure 15:
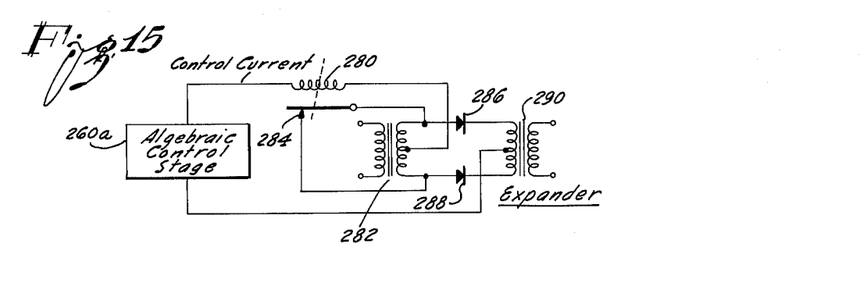
FIGURE 15 is a circuit diagram of a controlled gain stage similar to that shown in FIGURE 9 when the controlled gain stage is to become operative only during the time that speech occurs in a room.

The circuit shown in FIGURE 15 may be used as the controlled gain circuit 272 to provide for the passage of masking signals through the controlled gain circuit only during the times that speech is actually occurring in the room 10. The embodiment illustrated in FIGURE 15 is somewhat similar to the embodiment illustrated in FIGURE 9 except that it includes a relay and an associated switch. In the embodiment shown in FIGURE 15, each algebraic control stage, such as the stage 260a is connected to a different relay. For example, the algebraic control stage 260a is connected to one terminal of a relay 280, the second terminal of which has a common connection with the center tap of the secondary winding in a transformer 282. The transformer 282 corresponds to the transformer 164 in the embodiment shown in FIGURE 9. The end terminals of the secondary winding in the transformer 282 are connected to the movable and stationary contact of a switch 284, the operation of which is controlled by the relay 280.

The end terminals of the secondary winding in the transformer 282 are also respectively connected to the plates of diodes 286 and 288 which have variable impedance characteristics similar to the characteristics described above for the diodes 166 and 168 in the embodiment shown in FIGURE 9. The cathodes of the diodes 286 and 288 have common connections with the end terminals of the primary winding in an output transformer 290 corresponding to the output transformer 170 in the embodiment shown in FIGURE 9. The center tap of the primary winding in the transformer 290 is connected to the second terminal of the algebraic control stage 260a.

During the time that no speech occurs in the room 10, no signal is produced by the algebraic control stages such as the stage 260a. This prevents a current from passing through the relays corresponding to the relay 280 in FIGURE 15. Since no current flows through the relay 280, the switch 284 remains in its normally closed state and shorts the secondary winding of the transformer 282. This prevents any signals from passing to the primary winding of the transformer 290 and prevents any output signals from passing from the stage 272 in FIGURE 1 to the loudspeaker 204.

When speech occurs in the room 10, signals are produced by the algebraic control stages such as the stage 260a. When the unvoiced aspects of speech are above an intelligible level, the resultant signals from the algebraic control stages cause currents to flow through the relays corresponding to the relay 280 so that the relays become energized. Upon an energizing of the relays corresponding to the relay 280, the switches corresponding to the switch 284 become open to remove the short circuit across the secondary windings of the transformers corresponding to the transformer 282. This causes signals to pass from the secondary winding of the transformer 282 to the primary winding of the transformer 290. The amplitude of the signals passing to the transformer 290 is dependent upon the impedance characteristics of the diodes 286 and 288. These impedance characteristics vary in accordance with the amplitude of the signals produced by the algebraic control stage 260a. This has been described in detail in connection with the embodiment shown in FIGURE 9.

Figure 16:
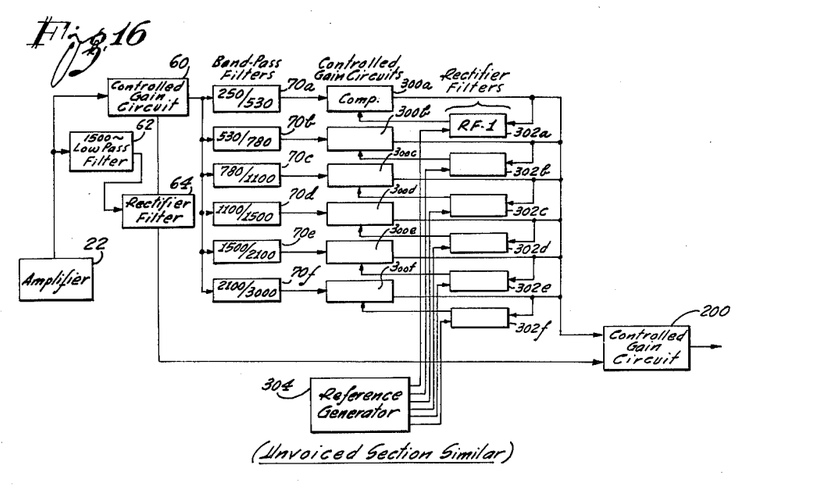
FIGURE 16 is a circuit diagram, substantially in block form, of a second embodiment of the invention.

The embodiment shown in FIGURE 16 is similar in many respects to the embodiment shown in FIGURE 2. It includes the controlled gain circuit 60, filter 62, the rectifier 64 and the band-pass filters 70a to 70f, inclusive. The signals from the band-pass filters 70a to 70f, inclusive, are respectively introduced directly to controlled gain circuits 300a to 300f, inclusive. The controlled gain circuits 300a to 300f, inclusive, are provided with characteristics similar to those of the controlled gain circuits 162a to 162f, inclusive. The controlled gain circuits 300a to 300f inclusive, preferably constitute compressors having the construction shown in FIGURE 10.

The signals from the controlled gain circuits 300a to 300f, inclusive, are introduced to rectifiers 302a to 302f, inclusive, which may have constructions similar to those described above for the rectifiers in the embodiment shown in FIGURE 2. The rectifiers 302a to 302f, inclusive, are biased by voltages from the reference generator 304, which may be provided with a construction similar to that of the reference generator 76 in the embodiment shown in FIGURE 2. The bias applied by the reference generator 304 to the rectifiers 302a to 302f, inclusive, corresponds to the average level of the curve 82 in FIGURE 3 over the range of frequencies passed by the corresponding one of the band-pass filters 70a to 70f, inclusive. The outputs from the rectifiers 302a to 302f, inclusive, are respectively introduced to the controlled gain circuits 300a to 300f, inclusive, to control the operation of these stages.

Figure 17:
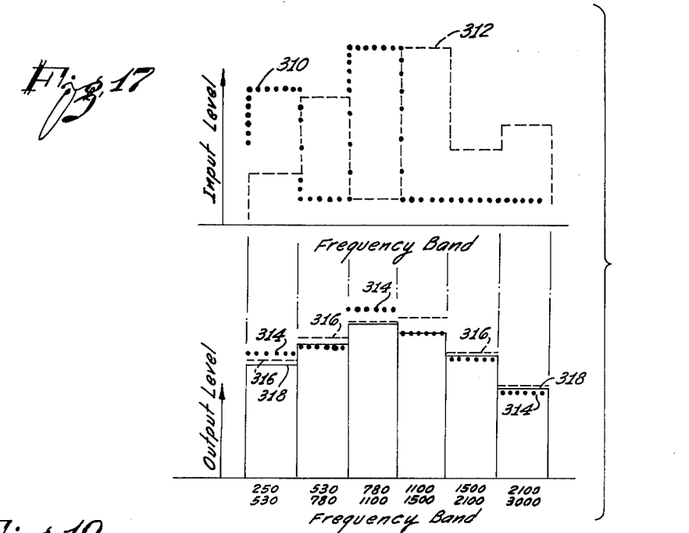
FIGURE 17 provides curves illustrating the operation of the embodiment shown in FIGURE 16.

The embodiment shown in FIGURE 16 operates on the principle that some energy exists in each frequency range corresponding to the ranges of the filters 70a to 70f, inclusive, when speech occurs in the room 10. The embodiment shown in FIGURE 16 operates on the further premise that the energy level in each of the frequency ranges upon the occurrence of speech in the room 10 is sufficient to obtain a proper operation of the controlled gain circuits 300a to 300f, inclusive. The average intensity of the speech in each of the frequency ranges corresponding to the ranges of the filters 70a to 70f, inclusive, for a first spoken sound is indicated by dots at 310 in FIGURE 17. The average intensity of the sounds for a different spoken word in the different frequency ranges of the filters 70a to 70f, inclusive, is indicated by dashes at 312 in FIGURE 17.

Since the signals passing through the band-pass filters 70a to 70f, inclusive are at a sufficient level to obtain a proper operation of the controlled gain circuits 300a to 300f inclusive, the controlled gain circuits are able to vary the level of the signals so as to fill the voids in the curve 82 in FIGURE 3. In other words, the controlled gain circuits 300a to 300f, inclusive, produce signals having amplitudes corresponding to the difference between the level of the curve 82 in each frequency range and the average level of the spoken words in that frequency range, as indicated by the curves 310 and 312 in FIGURE 17 for different spoken words. The controlled gain circuits 300a to 300f, inclusive, normally operate at a relatively low level and provide a considerable gain in amplitude when no voiced aspects of speech occur in the room 10 in the frequency ranges individual to each of the circuits. The gain is amplitude provided by the controlled gain circuits 300a to 300f, inclusive, decreases in accordance with increases in the intensity of the voiced aspects of speech in the range individual to each of the controlled gain circuits 300a to 300f, inclusive.

The signals passing through the controlled gain circiuts 300a to 300f, inclusive, are respectively introduced to the rectifiers 302a to 302f, inclusive, where they are compared with the reference voltages from the generator 304.

When the signals produced by the conrolled gain circuits 300a to 300f, inclusive, have amplitudes less than the biases provided by the reference generator 304, the biases provided by the reference generator control the gain of the controlled gain circuits. For example, when the amplitude of the signal produced by the controlled gain circuit 300a is less than the bias introduced by the reference generator 304 to the rectifier filter 302a, the bias provided by the reference generator controls the gain in the controlled gain circuit 300a.

When the signal provided by the controlled gain circuit 300a has an amplitude greater than the bias provided by the reference generator 304, the signal from the controlled gain circuit passes through the rectifier 302a to the controlled gain circuit 300a to vary the gain of the controlled gain circuit 300a. In this way, the gain of the controlled gain circuit 300a is regulated to obtain an output from the controlled gain circuit corresponding to the difference in the level between the average level of the curve 82 in the region of 250 to 530 cycles per second and the amplitudes of the signals passing through the bandpass filter 70a. The combined output of the signals 310 and the signals broadcast by the system of FIGURE 16 in response to the signals 310 is indicated in dotted lines at 314 in FIGURE 17. Similarly, the combined output of the signals 312 representing a spoken sound and the signals broadcast by the system of FIGURE 16 in response to the signals 312 is indicated in dashed lines at 316 in FIGURE 17. The normal output is indicated in solid lines at 318 in FIGURE 17.

It will be seen from the previous discussion that the embodiment shown in FIGURE 16 does not require certain of the stages included in the embodiment shown in FIGURE 2. For example, the embodiment shown in FIGURE 16 does not require the pitch extractor 26 and the pulse generator 28. The embodiment shown in FIGURE 16 also does not require the algebraic control stages corresponding to the stages 74a to 74f, inclusive, and further does not require the band-pass filters corresponding to the filters 160a to 160f, inclusive, in FIGURE 2. However, the controlled gain circuits 300a to 300f, inclusive, in the embodiment shown in FIGURE 16 may have to have increased sensitivity of response relative to the sensitivity of response of the controlled gain circuits 162a to 162f, inclusive, in the embodiment shown in FIGURE 2.

Figure 18:
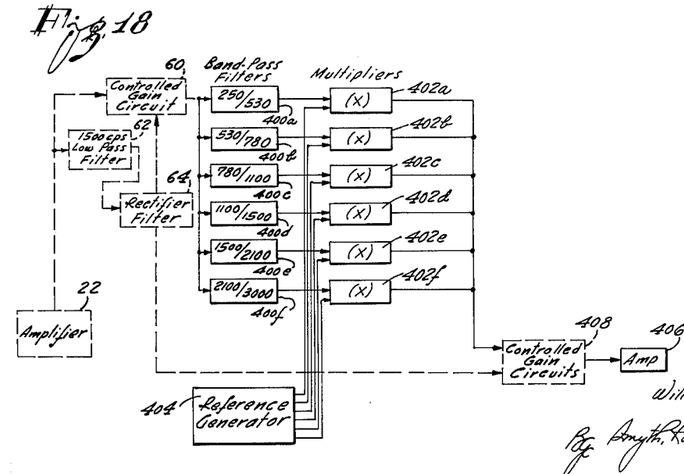
FIGURE 18 is a circuit diagram of a third embodiment of the invention.

In the embodiment shown in FIGURE 18, the signals from the amplifier 22 are illustrated as being introduced to the controlled gain circuit 60 and the low pass filter 62 in a manner similar to that shown in the embodiments of FIGURES 2 and 16. The filter 64 is also included in the embodiment shown in FIGURE 18. However, it will be appreciated that the stages 60, 62 and 64 do not have to be included in the embodiment shown in FIGURE 18. This is indicated by the inclusion of these stages with broken lines in FIGURE 18. When the stages 60, 62 and 64 are included, signals of regulated amplitude are introduced from the stage 60 to a plurality of band-pass filters 400a to 400f, inclusive. The filters 400a to 400f, inclusive, may be constructed in a manner similar to that of the filters 70a to 70f, inclusive, in the embodiment shown in FIGURE 2 and may be provided with frequency characteristics respectively corresponding to those of the filters 70a to 70f, inclusive.

The signals from the filters 400a to 400f, inclusive, respectively pass to multiplier stages 402a to 402f, inclusive. The multiplier stages also receive signals from a plurality of reference oscillators indicated collectively by a single stage 404. The oscillators 404 are constructed to provide signals at a particular frequency which does not necessarily have to have a value individual to the operating range of the filters 400a to 400f, inclusive. For example, the reference oscillators 404 may be constructed to introduce to the multiplier 402a a signal having a frequency of approximately 250 cycles per second when the band-pass filter 400a has a range of 250 to 530 cycles per second. Similarly, the reference oscillators 404 may be constructed to introduce to the multiplier 404a a signal having a frequency of approximately 300 cycles per second when the bandpass filter 400b has a range of approximately 530 to 780 cycles per second.

If the voice component has a fundamental of 125 cycles per second, harmonics having frequencies of 250, 375 and 500 cycles per second pass through the band-pass filter 400a to the multiplier 402a. These signals are mixed with the oscillator frequency of 250 cycles per second to obtain beat frequencies between the oscillator frequency and the frequencies of the signals passing through the filter 400a. The beat frequencies may constitute the sum of the oscillator frequency from the stages 404 and the individual frequencies of the fundamental and harmonic signals passing through the filter 400a. The beat frequency may also constitute the difference between the individual frequencies of the signals passing through the filter 400a and the oscillator frequency. Under such circumstances, signals having principal frequencies of 125, 250, 500, 625 and 750 cycles per second would be produced by the multiplier 402a.

Figure 19:
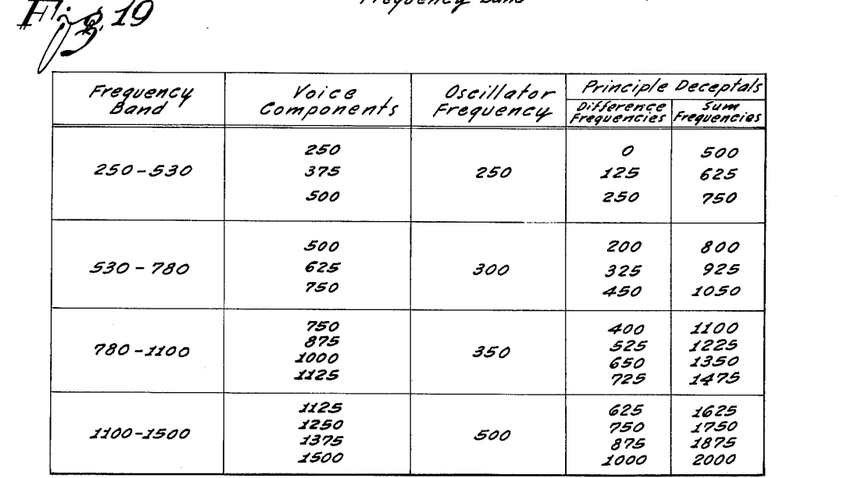
FIGURE 19 is a table illustrating the production of signals at different frequencies by the embodiment shown in FIGURE 18.

FIGURE 19 constitutes a table which indicates in a first column the frequency band of the signals passed by each of the filters 400a to 400d, inclusive. FIGURE 19 indicates in a second column the frequency components of the speech passing through each of the filters 400a to 400d, inclusive, when the fundamental frequency of the speech in the room 10 is 125 cycles per second. The third vertical column in FIGURE 19 indicates the oscillator frequency produced by the stages 404 and introduced to each of the multipliers 400a to 400d, inclusive. The fourth and fifth columns in FIGURE 19 indicate the principal beat frequency signals which are produced by each of the multipliers 402a to 402d, inclusive. The fourth column represents the difference frequencies and the fifth column represents the sum frequencies.

As will be seen from the table indicated at FIGURE 19, the difference and sum frequencies occur throughout the complete frequency band. Because of this, the system shown in FIGURE 18 is operative to fill frequency voids which occur at each instant in the characteristics of the speech in the room 10 at that instant. The signals generated by the multipliers 402a to 402d, inclusive, may be introduced directly to an amplifier 406 corresponding to the amplifier 202 in the embodiment shown in FIGURE 2. The signals from the multipliers 402a to 402f, inclusive, may also be introduced to the amplifier 406 through a controlled gain circuit 408 which performs functions similar to the controlled gain circuit 200 in the embodiment shown in FIGURE 2.

The embodiment shown in FIGURE 18 is advantageous in that it fills voids in the frequency spectrum on a relatively simple basis. However, the embodiment shown in FIGURE 18 does not fill the voids in a consistent manner to raise the level of the sound broadcast from the room to a particular and consistent pattern such as that illustrated by the envelope 82 in FIGURE 3.

Certain modifications may be provided in the embodiment of FIGURE 18 to further mask the intelligibility of the sounds broadcast from the room 10. For example, the amplitudes of the signals produced by the reference oscillators 404 may be varied to produce warbled characteristics. The variations may occur either on a constant basis or preferably on a random basis. Masking may be furrther provided by having the reference oscillators produce a plurality of signals at different frequencies for introduction to each of the multipliers 402a to 402f, inclusive, rather than introduce signals at only one frequency to each of the multipliers. Each of the signals in the plurality may be warbled in a consistent or random pattern to further mask the intelligibility of the sound broadcast from the room 10.

Although this invention has been disclosed and illustrated with reference to particular applications, the principles involved are susceptible of numerous other applications which will be apparent to persons skilled in the art. The invention is, therefore, to be limited only as indicated by the scope of the appended claims.

What is claimed is:

1. In a system for disguising speech to prevent the speech from being understood in a frequency range defining the speech, first means responsive to the speech for converting the speech at each instant into electrical signals having frequency characteristics representing the speech, second means for providing reference signals having a particular pattern at the different signals constituting the frequency range to provide a particular envelope, third means responsive to the signals from the first means and the second means at each instant for comparing the signals from the first and second means to produce complementary signals having characteristics representing differences relative to the particular envelope in the frequency and amplitude characteristics of the electrical signals representing the speech, and fourth means responsive to the complementary signals for converting such signals into sounds having characteristics corresponding to those of the complementary signals for combination with the speech.

2. In a system for disguising speech to prevent the speech from being understood in a frequency range defining the speech first means responsive to the speech for converting the speech at each instant into electrical signal having frequency characteristics representing the speech, second means responsive to the signals from the first means for separating the electrical signals at each instant into a plurality of component signals having different frequency ranges, third means for providing electrical signals having amplitude characteristics representing a particular pattern over the frequency range defining the speech, fourth means responsive to each of the component signals in the plurality from the second means and responsive to the signals from the third means for producing complementary signals having at each instant frequencies dependent upon the frequencies of the component signals at the instant and having amplitude characteristics representing differences in the amplitude characteristics of the signal from the second and third means, and fifth means responsive to the complementary signals at each instant for producing sounds having characteristics corresponding to those of the complementary signals for mixing with the speech.

3. In a system for disguising speech to prevent the speech from being understood in a frequency range defining the speech, first means responsive to the speech for converting the speech at each instant into electrical signals having amplitude characteristics representing the speech at the different frequencies in the frequency range defining the speech, second means for providing signals having at the different frequencies in the frequency range amplitude characteristics representing a particular pattern, third means responsive to the electrical signals representing the speech and to the signals from the second means for producing signals at frequencies dependent upon the frequency patterns of the speech and dependent upon the relative amplitudes of the signals representing the speech and the signals from the second means and, fourth means responsive to the electrical signals produced by the third means for converting the signals from the third means into sounds having characteristics corresponding to those of the signals from the third means for mixing with the speech.

4. In a system for disguising speech to prevent the speech from being understood, first means responsive to the speech for converting the speech into electrical signals having at each instant characteristics representing the pattern of the speech, second means responsive to the electrical signals for converting the electrical signals into first signals representing voiced components of the speech and into second signals representing unvoiced components of the speech, third means responsive to the first signals representing the voiced components of the speech for producing first complementary signals having frequencies dependent upon the frequencies of the first signals, fourth means responsive to the second signals representing the unvoiced components of the speech for producing second complementary signals having frequencies dependent upon the frequencies of the second signals, fifth means responsive to the signals from the third and fourth means for combining the first and second complementary signals to produce resultant signals masking the intelligibility of the speech, and sixth means responsive to the signals from the fifth means for converting the resultant signals from the fifth means into sound having characteristics corresponding to those of the resultant signals for mixing with the speech.

5. In a system for disguising speech to prevent the speech from being understood in a frequency range defining the speech, first means responsive to the speech for converting the speech at each instant into electrical signals having frequency characteristics representing the speech, second means responsive to the signals from the first means for separating the signals into a plurality of channels each having characteristics for passing different components of the signals in an individual range of frequencies, third means responsive to the signals from the second means in each channel for producing complementary signals having characteristics representing voids at different frequencies relative to a particular envelope defining the frequency and amplitude characteristics of the electrical signals passing through the different channels, and fourth means responsive to the complementary signals from the third means for converting the complementary signals into sounds having characteristics corresponding to those of the complementary signals for mixing with the speech.

6. The system set forth in claim 5 wherein means are operatively coupled to the first and third means for obtaining the production of the complementary signals by the third means only during the actual occurrences of the speech.

7. The system set forth in claim 5 wherein fifth means are operatively coupled to the first means for producing signals upon the occurrence of dynamic changes in the speech and wherein sixth means are operatively coupled to the fourth and fifth means for obtaining a conversion by the fourth means of the signals from the fifth means into corresponding sounds to provide a further disguising of the speech.

8. In a system for disguising speech to prevent the speech from being understood, first means including first electrical circuitry responsive to the speech for converting the speech at each instant into electrical signals having characteristics representing the speech, second means including second electrical circuitry responsive to the signals from the first means at each instant for separating the components of the signals into different channels where each channel passes signals only in an individual range of frequencies different from the range in the other channels, third means including third electrical circuitry responsive to the signals produced in each channel by the second means for producing complementary signals at frequencies representing at each instant voids in the frequency characteristics of the signals representing speech in the different channels, fourth means including fourth electrical circuitry responsive to the complementary signals produced in each channel for adjusting the amplitude level of the complementary signals in accordance with the amplitude level of the signals representing the speech, and fifth means responsive to the electrical signals from the fourth means for converting such signals into sound having characteristics corresponding to those of the signals.

9. The system set forth in claim 8 wherein means are operatively coupled to the first and third means for obtaining the production of the complementary signals by the third means only during the actual occurrence of the speech.

10. In a system for disguising speech to prevent the speech from being understood, first means responsive to the speech for converting the speech at each instant into electrical signals having characteristics representing the speech, second means responsive to the electrical signals representing the speech for extracting the fundamental frequency from such signals and for producing harmonics of such fundamental frequency, third means for providing signals having an amplitude representing a particular envelope at the fundamental and harmonic frequencies, fourth means responsive to the signals from the first, second and third means for producing signals having only the particular amplitude portions required to produce the particular envelope at the fundamental and harmonic frequencies with the signals from the first means, fifth means responsive to the fourth means for varying the gain of the signals from the fourth means to vary the level of the particular envelope in accordance with the loudness of the speech at each instant, and sixth means responsive to the signals from the fifth means for converting the signals from the fifth means into sounds having characteristics corresponding to the characteristics of the signals for mixing with the speech.

11. In a system for disguising speech to prevent the speech from being understood.

first means responsive to the speech for converting the speech at each instant into signals having characteristics representing the speech, second means for providing reference signals at particular frequencies, third means operatively coupled to the first and second means for mixing the signals from the first and second means to produce at each instant signals having frequency characteristics different from the frequency characteristics of the speech at that instant and having frequencies different from the frequencies of the signals defining the speech at each instant, and fourth means responsive to the signals from the third means for converting the signals into sound having characteristics corresponding to the characteristics of the signals from the third means at each instant for mixing with the speech.

12. The system set forth in claim 11 wherein the means for providing the reference signals are constructed to provide the reference signals with varied characteristics at successive periods of time to obtain the production of signals with warbled characteristics by the third means.

13. In a system for masking speech to prevent the speech from being understood, means responsive to the speech at each instant for producing signals having frequency characteristics representing the characteristics of the speech at that instant, means responsive to the signals at each instant for separating the signals into first signals representing the voiced aspects of the speech at that instant and into second signals representing the unvoiced aspects of speech at that instant, means responsive to the signals representing the voiced aspects of speech at each instant for producing first masking signals having frequencies dependent upon the frequencies of the signals in the voiced aspects of speech at that instant, means responsive to the signals representing the unvoiced aspects of speech at each instant for producing second masking signals having frequencies dependent upon the frequencies of the signals in the unvoiced aspects of speech at that instant, and means responsive to the first and second masking signals for broadcasting sounds having characteristics corresponding to the characteristics of such signals to prevent the speech from being understood.

14. The system set forth in claim 13 wherein means are responsive to the signals representing speech for obtaining the production of the first and second masking signals only during the actual occurrences of the speech.

15. The system set forth in claim 14 wherein the means for producing the first masking signals are constructed to produce varied characteristics in the first masking signals at successive instants of time to provide warbled characteristics in the first masking signals.

16. In a system for masking speech to prevent the speech from being understood, means responsive to the speech at each instant for producing signals having frequency characteristics representing the characteristics of the speech at that instant, means responsive to the signals at each instant for separating the signals into a first frequency range representing the voiced aspects of speech and into a second frequency range representing the unvoiced aspects of speech, means responsive to the signals in the first frequency range for comparing the amplitude of such signals with a desired amplitude pattern in the first frequency range and for producing first masking signals representing any differences between the desired pattern and the signals in the first frequency range, means responsive to the signals in the second frequency range for comparing the amplitude of such signals with a desired amplitude pattern in the second frequency range and for producing second masking signals representing any differences between the desired pattern and the signals in the second frequency range, and means responsive to the first and second masking signals for broadcasting sounds having characteristics corresponding to the characteristics of such signals to mask the speech.

17. In a system for masking speech to prevent the speech from being understood, means responsive to the speech for converting the speech into signals having characteristics corresponding to the characteristics of the speech, means responsive to the signals for producing first masking signals having frequency characterics different from the frequency characteristics of the signals representing the speech, means responsive to dynamic changes in the signals representing the speech for producing second masking signals having characteristics dependent upon the characteristics of such dynamic changes, and means responsive to the first and second masking signals for broadcasting sounds having characteristics corresponding to those of such masking signals to mask the speech.

18. In a system for masking speech to prevent the speech from being understood, means responsive to the speech for converting the speech into signals having characteristics corresponding to the characteristics of the speech, means responsive to the signals representing the speech for separating the signals into a first frequency range representing the voiced aspects of the speech and into a second frequency range representing the unvoiced aspects of the speech, means responsive to the signals in the first frequency range for producing first masking signals having frequency and amplitude characteristics dependent upon the frequency and amplitude characteristics of the signals in the first frequency range, means responsive to the signals in the second frequency range for producing second masking signals having frequency and amplitude characteristics dependent upon the frequency and amplitude characteristics of the signals in the second frequency range, means responsive to the dynamic change in the signals in the first frequency range for producing third masking signals having characteristics dependent upon the characteristics of the dynamic changes in the signals in the first frequency range, and means responsive to the first, second and third masking signals for broadcasting sounds having characteristics corresponding to the characteristics of such signals to mask the speech.

19. In a system for masking speech to prevent the speech from being understood, means responsive to the speech for converting the speech into signals having characteristics corresponding to the characteristics of the speech, means responsive to the signals representing the speech for separating the speech into a plurality of different frequency ranges, means for providing reference signals at particular reference frequencies, means responsive to the reference signals and the signals representing the speech in the different freqeuncy ranges for combining such signals to produce beat frequency signals at frequencies different from the frequencies of the signals representing the speech, and means responsive to the beat frequency signals for broadcasting sounds having characteristics corresponding to the characteristics of such signals to mask the speech.

20. The system set forth in claim 19 wherein the means for providing reference signals are constructed to provide the reference signals with varied characteristics at successive periods of time to provide the beat frequency signals with warbled characteristics for further masking the speech.

21. In a system for masking speech to prevent the speech from being understood, means responsive to the speech for converting the speech into first signals having characteristics corresponding to the characteristics o fthe speech, means responsive to the first signals for producing first masking signals having frequency characteristics different from the frequency characteristics of the signals representing the speech, means responsive to the first signals for inhibiting the production of the first masking signals during the intervals between the speech, and means responsive to the first masking signals for broadcasting sounds having characteristics corresponding to those of the masking signals to mask the speech.

22. The system set forth in claim 21 wherein the means for producing the first masking signals are constructed to provide signals with carried characteristics to provide warbled characteristics to the first masking signals.

23. In a system for disguising speech to prevent the speech from being understood in a frequency range defining the speech, first means responsive to the speech for converting the speech into electrical signals having at each instant amplitude characteristics representing the pattern of the speech, second means responsive to the electrical signals for converting the electrical signals into first signals representing voiced components of the speech and into second signals representing unvoiced components of the speech, third means for providing signals having particular amplitude characteristics at the different frequencies in the frequency range defining the speech, fourth means responsive to the first signals representing the voiced components of the speech and to the signals from the third means for producing first complementary signals having amplitude characteristics dependent upon the relative amplitude characteristics of the first signals and the signals from the third means, fifth means responsive to the second signals representing the unvoiced components of the speech for producing second complementary signals having amplitude characteristics dependent upon the amplitude characteristics of the second signals, sixth means responsive to the signals from the third and fourth means for combining the first and second complementary signals to produce resultant signals masking the intelligibility of the speech, and seventh means responsive to the signals from the fifth means for converting the resultant signals from the fifth means into sound having characteristics corresponding to those of the resultant signals for mixing with the speech.

References Cited by the Examiner

UNITED STATES PATENTS

| 2,339,465 | 1/44 | Dudley | 179—1 |
| 2,406,825 | 9/46 | French | 179—1.5 |
| 2,553,610 | 5/51 | Singleton | 179—1 |

OTHER REFERENCES

"A Resonance-Vocoder and Baseband Complement"; "A Hybrid System for Speech Transmission" by J. L. Flanagan, IRE Transactions on Audio, May–June 1960, pages 95–102.

ROBERT H. ROSE, *Primary Examiner.*